United States Patent
Dahanayake et al.

(10) Patent No.: US 7,404,442 B2
(45) Date of Patent: Jul. 29, 2008

(54) METHOD OF RECYCLING FRACTURING FLUIDS USING A SELF-DEGRADING FOAMING COMPOSITION

(75) Inventors: Manilal S. Dahanayake, Princeton Junction, NJ (US); Subramanian Kesavan, East Windsor, NJ (US); Allwyn Colaco, South River, NJ (US)

(73) Assignee: Rhodia Inc., Cranbury, NJ (US)

( * ) Notice: Subject to any disclaimer, the term of this patent is extended or adjusted under 35 U.S.C. 154(b) by 44 days.

(21) Appl. No.: 11/399,223

(22) Filed: Apr. 6, 2006

(65) Prior Publication Data

US 2006/0260815 A1   Nov. 23, 2006

Related U.S. Application Data

(60) Provisional application No. 60/668,770, filed on Apr. 6, 2005.

(51) Int. Cl.
*E21B 43/26* (2006.01)
*E21B 43/00* (2006.01)

(52) U.S. Cl. .................... 166/308.6; 166/309

(58) Field of Classification Search ............. 166/308.6, 166/309
See application file for complete search history.

(56) References Cited

U.S. PATENT DOCUMENTS

| | | | |
|---|---|---|---|
| 3,664,422 A | | 5/1972 | Bullen |
| 3,937,283 A | * | 2/1976 | Blauer et al. ............... 166/307 |
| 3,980,136 A | | 9/1976 | Plummer et al. |
| 4,453,596 A | * | 6/1984 | Conway et al. ............ 166/278 |
| 4,627,495 A | | 12/1986 | Harris et al. ............... 166/280 |
| 5,360,558 A | * | 11/1994 | Pakulski et al. ........... 507/202 |
| 5,480,586 A | | 1/1996 | Jakubicki et al. .......... 252/545 |
| 5,595,723 A | | 1/1997 | Quay ......................... 424/9.5 |
| 6,148,917 A | * | 11/2000 | Brookey et al. ............ 166/301 |
| 2003/0207768 A1 | | 11/2003 | England et al. |
| 2004/0200616 A1 | | 10/2004 | Chatterji et al. |

* cited by examiner

*Primary Examiner*—Zakiya W. Bates
*Assistant Examiner*—Angela M DiTrani
(74) *Attorney, Agent, or Firm*—Kevin E. McVeigh; Jericho B. Pacho

(57) ABSTRACT

A method of fracturing a subterranean zone penetrated by a well bore by preparing a foamed fracturing fluid containing a self-degrading foaming composition comprised of a mixture of anionic surfactant and nonionic surfactant. The fracturing fluid containing a self-degrading foaming composition forms a substantially less stable foam when the foamed fracturing fluid is recovered during reclaim.

13 Claims, No Drawings

METHOD OF RECYCLING FRACTURING FLUIDS USING A SELF-DEGRADING FOAMING COMPOSITION

The present application claims the benefit of U.S. Provisional Patent Application Ser. No. 60/668,770 filed on Apr. 6, 2005, which is hereby incorporated by reference.

FIELD OF THE INVENTION

This invention generally relates to method of recycling foamed fracturing fluids used in fracturing subterranean formations in oil and gas wells. More specifically, the invention relates to a self-degrading foaming composition that enhances the recycling of foamed fracturing fluids due to its defoaming character during reclaim of the fluid.

BACKGROUND OF THE INVENTION

Natural resources such as gas, oil, minerals, and water residing in a subterranean formation can be recovered by drilling wells into the formation. The fluids in the subterranean formation are driven into the wells by, for example, pressure gradients that exist between the formation and the wells, the force of gravity, displacement of the fluids using pumps or the force of another fluid injected into the wells. The production of such fluids is commonly increased by hydraulically fracturing the subterranean formations. That is, a viscous fracturing fluid is pumped into a well to a subterranean formation at a rate and a pressure sufficient to form fractures that extend into the formation, providing additional pathways through which the fluids can flow to the wells.

The fracturing fluid is usually a water-based fluid containing a gelling additive to increase the viscosity of the fluid. The gelling additive thus reduces leakage of liquid from the fractures into the subterranean formation and improves proppant suspension capability. The gelling additive is commonly a polymeric material that absorbs water and forms a gel as it undergoes hydration.

In certain applications one or more foaming surfactants are added to the fracturing fluid. A gas is mixed with the fracturing fluid to produce a foamed fracturing fluid, thus ensuring that the pressure exerted by the fracturing fluid on the subterranean formation exceeds the fracture gradient (psi/ft.) to create the fracture. The foamed fracturing fluid is injected by foaming the fracturing fluid with nitrogen or carbon dioxide. The foaming composition containing one or more surfactants facilitates the foaming and stabilization of the foam produced when the gas is mixed with the fracturing fluid.

After a fracturing fluid has been used to form fractures in a subterranean formation, it is usually returned to the surface. It would be desirable to have the ability to recycle the fracturing fluid to form additional fractures in the same subterranean formation or to form fractures in one or more different subterranean formations. Frequently, foamed fracturing fluids are not suitable for recycling. In the recycling operations it is desirable to have a fracturing fluid to be without foam for ease of operation. These recycling operations require addition of defoamer to the fracturing fluids to decrease the foaming and ease of operation.

Alternatively, the pH of the fracturing fluid may be changed to obtain defoaming during recycling conditions. However, this approach is susceptible to pH fluctuations and if the pH is changed back to the high foaming state, the fracturing fluid will foam again and severely hinder the ease of recycling operation. U.S. Patent Application No: 2004/02006616 to Chatterji et al., Oct. 14, 2004, describes cationic tertiary alkyl amine ethoxylates and its mixtures with anionic and amphoteric compounds which can be foamed at pH greater than 9 and defoamed at pH less than 6 or foamed at pH less than 6 and defoamed at pH greater than 9.

U.S. Patent Application 2003/0207768 to England et. al., Nov. 6, 2003, describes a foaming well treatment fluid comprising an amphoteric surfactant. The objective of this patent is to use surfactants that have good wetting characteristics in the presence of coal and be effective foaming agents. Also the recycling of the foamed fracturing fluid is obtained by lowering the pH of the fluid. However such systems are susceptible to pH variations. In addition, adjustment of pH involves additional steps in the recycling operations and usually pH adjustment involves addition of acids that are not desired in terms of environmental acceptability.

It is desirable that the fracturing fluid does not foam in the fracturing blender or at any stage before it without the change of pH and/or addition of defoamer. Further, a foaming composition that foams initially but will be substantially less in foam stability after time is highly desirable for recycling operations. Typically a foaming composition that will foam initially and after about 24 hours to have low foam stability is suitable to facilitate processing.

Accordingly, there is provided a foamed fracturing fluid comprised of water, a self-degrading foaming composition comprising one or more surfactant. The foamed composition will foam initially but will have reduced foam stability when the fracturing fluid is recovered during flowback.

SUMMARY OF THE INVENTION

It is an object of the present invention to provide a method of fracturing a subterranean zone penetrated by a well bore comprising:

(a) preparing a foamed fracturing fluid comprised of water, a self-degrading foaming composition comprising a mixture of anionic surfactant and nonionic surfactant, and sufficient gas to a foam and (b) contacting said subterranean zone with said foamed fracturing fluid under conditions effective to create at least one fracture therein, wherein the foamed fracturing fluid forms a substantially less stable foam when the foamed fracturing fluid is recovered during recycling.

It has been unexpectedly found that the use of foaming composition comprising an anionic surfactant and a nonionic surfactant will foam initially but will not foam after aging compared to the conventional foaming agents used in the recycle operations. A foamed fracturing fluid in accordance with the invention may contain a gelling agent. The foamed fracturing fluid of the invention does not depend on the change of pH for defoaming during recycling of the fracturing fluid.

Another object of this invention to introduce a foaming composition in the fracturing fluid, which does not foam in the fracturing blender or any previous processing stage.

It is still another object of the invention to have a foamed fracturing fluid where the addition of a defoamer is not required to decrease the foam during the recycle operations.

A further object of the invention is to obtain a foaming composition and a foamed fracturing fluid that are not affected by significant pH changes induced by addition of acids or buffers for defoaming during reclaim in the recycling step.

It is still another object of the present invention to have a fracturing fluid to be formulated with a relatively low level of surfactant for cost-effective performance.

DETAILED DESCRIPTION OF THE INVENTION

Surfactants are used in a self-degrading foaming composition of a foamed fracturing fluid to promote and stabilize gas-liquid dispersions. Useful surfactants include anionic and nonionic compounds. Anionic and nonionic surfactants are added in concentrations that range preferably from about 0.05 to about 2 percent of the liquid component volume (from about 0.5 to about 20 gallons per 1000 gallons of liquid); more preferably from about 0.05 to about 1 percent of the liquid component volume.

Anionic Surfactants

Selected anionic surfactants useful in the self-degrading foaming composition of the present invention include dodecylbenzenesulfonates, alpha olefin sulfonates, diphenyloxide disulfonates, alkyl naphthalene sulfonates, sulfosuccinates, sulfosuccinamates, naphthalene-formaldehyde condensates, alkyl sulfoesters and alkyl sulfoamides and mixtures thereof. Preferred anionic surfactants are sulfosuccinates and sulfosuccinamates. Most preferred anionic surfactants are sulfosuccinamates such as disodium lauramide monoethanolamine sulfosuccinamate.

Representative anionic surfactants include those of the following structural formulas:

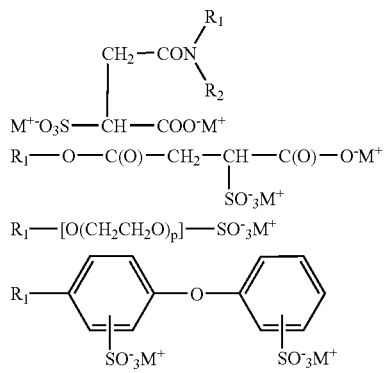

and combinations thereof.

$R_1$ is selected from a group consisting of alkyl, aryl, alkaryl, alkylarylalkyl, arylalkyl, alkylamidoalkyl and alkylaminoalkyl; wherein the alkyl group has about 10 to about 18 carbon atoms; wherein the aryl group represents a phenyl, diphenyl, diphenylether, or naphthalene moiety.

$R_2$ is selected from a group consisting of hydrogen, —$CH_2CH_2OH$, alkyl, aryl, alkaryl, alkylarylalkyl, arylalkyl, alkylamidoalkyl and alkylaminoalkyl; wherein the alkyl group has about 10 to about 18 carbon atoms; wherein the aryl group represents a phenyl, diphenyl, diphenylether, or naphthalene moiety.

p is 0 to about 10, preferably 0 to about 5.

M is hydrogen, an alkali metal such as sodium or potassium, or an ammonium salt. M is preferably an alkali metal such as sodium or potassium, more preferably sodium.

Nonionic Surfactants

Nonionic surfactants, include, but are not limited to, fatty acid esters, glycerol esters, ethoxylated fatty acids esters of glycol, ethoxylated fatty acid esters of polyethylene glycol and sorbitan esters. Preferred nonionic surfactants are glycerol esters, ethoxylated fatty acids esters of glycol and ethoxylated fatty acid esters of polyethylene glycol. Most preferred are ethoxylated fatty acid esters of polyethylene glycol.

Selected nonionic surfactants have the structures:

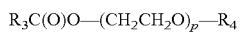

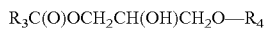

and combinations thereof.

$R_3$ is preferably a hydrocarbon chain containing about 10 to about 22 carbon atoms and may be branched or straight chained and saturated or unsaturated; $R_4$ is preferably a hydrogen or a hydrocarbon chain containing about 1 to about 20 carbon atoms and may be branched or straight chained and saturated or unsaturated; p is from about 1 to about 20, preferably from about 5 to about 20, more preferably from about 5 to about 12.

The water utilized for forming the foamed fracturing fluid of this invention can be fresh water or salt water. The term "salt water" is used herein to mean unsaturated salt solutions and saturated salt solutions including brines and seawater. In addition the water may contain dissolved organic salts, organic acids, organic acid salts, inorganic salts, or combinations thereof.

The gelling agent is added to the water for forming the water into gelled water and increasing the viscosity of the water. A variety of gelling agents can be used including natural or derivatized polysaccharides that are soluble, dispersible or swellable in an aqueous liquid to impart viscosity to the aqueous liquid. One group, for example, of polysaccharides that are suitable for use in accordance with the present invention include galactomannan gums such as gum arabic, gum ghatti, gum karaya, tamarind gum, tragacanth gum, guar gum, locust beam gum and the like. Modified gums such as carboxyalkyl derivatives (for example, carboxymethylguar) and hydroxyalkyl derivatives (for example, hydroxypropylguar) can also be used. Double derivatized gums such as carboxymethylhydroxypropylguar can also be used. Mixtures of the galactomannan gums and modified gums can also be used. Optionally, a variety of conventional additives that do not adversely affect the self degrading foaming tendencies of the fracturing fluid can be used. For example, optional additives may include gel stabilizers, gel breakers, clay stabilizers, bactericides, fluid loss additives and the like.

Foamed fracturing fluids are superior to conventional liquid fracturing fluids for problematic and water sensitive formations because foams contain substantially less liquid than liquid fracturing fluids and therefore have less tendency to leak. Also, the use of foams require less liquid retrieval after the fracturing operation is complete. Moreover, the sudden expansion of the gas in the foams from pressure in the well being relieved after the fracturing operation is complete promotes flow of residual fracture fluid liquid back into the well. The foamed fracturing fluid may also include a proppant material for preventing formed fractures from closing. A variety of proppant materials can be utilized including, but not limited to, resin coated or un-coated sand, sintered bauxite, ceramic materials and glass beads. Proppant material is preferably used in an amount in the range of from about 1 to about 10 pounds of proppant material per gallon of the foamed fracturing fluid.

Examples of gases suitable for foaming the fracturing fluid of this invention are air, nitrogen, carbon dioxide and mixtures thereof. The gas may be present in the fracturing fluid preferably in an amount in the range of from about 10% to about 95% by volume of liquid, more preferably from about 20% to about 90%, and most preferably from about 20% to about 80% by volume.

The gas volumetric fraction or "foam quality" of useful foamed fracture fluids is preferably in the range of from about 50 volume percent to about 80 volume percent gas. However, stable foams with foam qualities of up to about 95% can be produced. In general, the viscosity of the foamed fluid increases with increasing quality.

The foam quality is expressed as a percentage as shown in the equation below:

[foam volume (ml)−liquid volume(ml)]×[100]/foam volume(ml)

Procedures for making and using foamed fracturing fluids are generally described in U.S. Pat. No. 3,937,283 to Blauer et al and U.S. Pat. No. 3,980,136 to Plummer et al. Briefly, these patents teach how to produce stable foam fracturing fluids using nitrogen, water, a surfactant and a sand proppant. The foam quality ranges between 53% to 99%. The foam is pumped down the well and into the formation at a pressure sufficient to fracture the formation. When the fracturing operation is complete, the pressure on the well is relieved at the wellhead. The foam is carried back into the well by the rush of expanding gas when pressure on the foam is reduced.

U.S. Pat. No. 3,664,422 to Bullen et al., generally describes fracturing techniques using carbon dioxide as the gas phase. First, an emulsion of liquefied carbon dioxide and water is formed using a surfactant to promote dispersion. Proppant is added to the emulsion and the emulsion-proppant slurry is pumped down the wellbore into the formation at a pressure sufficient to fracture the subterranean formation. Downhole temperatures are above the critical temperature of carbon dioxide so the liquid carbon dioxide becomes a supercritical fluid as the emulsion approaches the subterranean formation forming a stable foam.

The foamed fracturing fluid in accordance with the present invention may optionally contain water-soluble inorganic salt, e.g. potassium chloride or ammonium chloride and/or at least one organic acid, water-soluble organic acid salt or organic salt, e.g. trimethyl ammonium chloride. These salts are dissolved in water.

In an embodiment of the invention a self-degrading foaming composition is prepared by mixing water with surfactant comprising anionic surfactant, nonionic surfactant, and combinations thereof. The foaming composition may contain an organic solvent. A preferred organic solvent is isopropyl alcohol. Standard mixing procedures known in the art can be employed since heating of the solution and special agitation conditions are normally not necessary. Of course, if used under conditions of extreme cold such as found in Alaska, normal heating procedures may be useful.

In another embodiment of the invention the initial pH of foamed fracturing composition comprising the self-degrading foaming composition may be lowered or raised to decrease the initial foam quality and subsequent aging may be performed to reduce foam stability. Alternatively it may be possible to raise the pH. The aging is done up to about 24 hours or longer at room temperature. Further, the aging is done at elevated temperatures preferably from about 80° F. to about 180° F. up to about 24 hours or longer.

Aging at 140° F. up to 24 hours or longer is most preferred. The initial decrease of pH may be brought about by adding acid and/or buffers. It may be suitable to add a base and/or buffers to increase the pH of self-degrading foaming composition.

The following examples are presented to illustrate the preparation and properties of foamed fracturing fluids containing self-degrading foaming compositions and should not be construed to limit the scope of the invention, unless otherwise expressly indicated in the appended claims.

EXAMPLES

Foamed fracturing fluids containing self-degrading foaming compositions were prepared and were found to have reduced foam stability after 24 hours of aging. These foams had good quality initially and half-life was substantially reduced after aging at 140° F. for 24 hours.

Materials:

GEREPON® SBL-203 is an anionic surfactant, disodium lauramide monoethanolamine sulfosuccinamate, supplied by Rhodia, Inc.

ALKAMULS® 600 DO is a nonionic surfactant, PEG-12 dioleate supplied by Rhodia, Inc.

Example 1

A foamed fracturing fluid with a viscosity of 9-10 cP is prepared by diluting a concentrated hydroxypropyl guar solution in tap water. About 100 ml of the fracturing fluid was added to a WARING® blender. The surfactant or surfactant blend was then added and the contents of the blender were mixed slowly. As the mixing speed was slowly increased, the height of the foam increased due to more air being trapped in the foam. The speed was gradually increased until the foam height remained stable and no further increase in the foam height was observed. The blender was shut off, and its contents were immediately poured into a graduated cylinder and a timer was started. The measured volume of the foam in the graduated cylinder was the foam volume. Foam quality was determined by the following equation:

Foam quality=100×(foam volume−liquid volume)/foam volume

As time progressed, the foam separated and a clear liquid was collected at the bottom of the cylinder. After 50% of the original liquid was collected in the bottom of the cylinder (i.e. 50 ml) the time was measured. This time was defined as the half-life. After measuring the half-life, the liquid was collected in a bottle and aged in an oven at a set temperature. After a given aging time at the set temperature the bottle was cooled to room temperature and quality and half-life were measured.

The foam volume and time required to reach the half-life (50 ml) was measured to show the recyclable nature of the foamed fracturing fluid. The foam testing results are shown in Table 1.

TABLE 1

Foam Testing Results

| Sample ID | Description | Testing Conditions | Foam Volume (ml) @ 75 F. | Half Life (min:sec) | Foam Quality (%) |
|---|---|---|---|---|---|
| | GEREPON SBL-203 only | | | | |
| A1 | 0.5 ml GEREPON SBL-203 | initial | 340 | 31:00 | 70.6 |
| | | 24 hrs@140 F. | 180 | 9:45 | 44.4 |
| B1 | 0.2 ml GEREPON SBL-203 | initial | 305 | 29:45 | 67.2 |
| | | 24 hrs@140 F. | 185 | 5:45 | 48.6 |
| | GEREPON SBL-203 with Alkamuls 600DO | | | | |
| C1 | 0.2 ml GEREPON SBL-203 + 0.05 ml Alkamuls 600 DO | initial | 275 | 24:15 | 63.6 |
| | | 24 hrs@140 F. | 135 | 1:30 | 26.0 |

TABLE 1-continued

Foam Testing Results

| Sample ID | Description | Testing Conditions | Foam Volume (ml) @ 75 F. | Half Life (min:sec) | Foam Quality (%) |
|---|---|---|---|---|---|
| D1 | 0.2 ml GEROPON SBL-203 + 0.1 ml ALKAMULS 600 DO | initial | 195 | 7:05 | 48.7 |
| | | 24 hrs@140 F. | 125 | very fast~5 sec | 20.0 |

Example 2

A foamed fracturing fluid of 9-10 cP was prepared as shown in Example 1. The foamed fracturing fluid containing the mixture of surfactants compared with the control Gereopon SBL were studied at various pH values. The foam height, foam quality and half-life were measured at various pH values as well as a function of time and are shown in Table 2, The foam quality degraded quickly at higher pH.

TABLE 2

Effect of Initial pH on the Foam Quality and Aging

| Designation | Surfactant | Solution pH | Weight (g) | Time (hr) | T (deg F.) | Foam Volume (ml) @ 75 F. | 1/2 Life (min) | Quality (%) | Final pH after 24 hr's |
|---|---|---|---|---|---|---|---|---|---|
| A2 | GEROPON SBL-203 (Control) | 11.8 | 100 | 0 | RT | 290 | 34.0 | 65.5 | 10.6 |
| | | | 89 | 2 | 140 | 145 | 3.3 | 38.6 | |
| | | | 82 | 6 | | 130 | 2.5 | 36.9 | |
| | | | 76 | 24 | | 120 | 2.3 | 36.7 | |
| B2 | $X_s$ | 11.8 | 100 | 0 | RT | 265 | 19.5 | 62.3 | 11.0 |
| | | | 93 | 2 | 140 | 120 | 0.0 | 22.5 | |
| | | | — | 6 | | | | | |
| | | | 88 | 24 | | 125 | 0.0 | 29.6 | |
| C2 | $X_s$ | 11.8 | 100 | 0 | RT | 260 | 16.5 | 61.5 | 11.3 |
| | | | 98 | 2 | | 135 | 0.5 | 27.4 | |
| | | | — | 6 | | | | | |
| | | | 91 | 24 | | 115 | 0.0 | 20.9 | |
| D2 | GEROPON SBL-203 (Control) | 10.1 | 100 | 0 | RT | 295 | 35.0 | 66.1 | 9.1 |
| | | | 89 | 2 | 140 | 270 | 32.0 | 67.0 | |
| | | | 82 | 6 | | 215 | 23.0 | 61.9 | |
| | | | 75 | 24 | | 180 | 17.0 | 58.3 | |
| E2 | $X_s$ | 10.1 | 100 | 0 | RT | 275 | 18.0 | 63.6 | 9.1 |
| | | | 94 | 2 | 140 | 235 | 14.0 | 60.0 | |
| | | | 86 | 6 | | 175 | 8.0 | 50.8 | |
| | | | 80 | 24 | | 125 | 1.5 | 36.0 | |

$X_s$: Formulated by blending 66.67% GEROPON SBL-203 + 16.67% ALKAMULS 600DO + 8.33% isopropanol + 8.33% Deionized water.

the invention has been described in the more limited aspects of preferred embodiments hereof, including numerous examples. Other embodiments have been suggested and still others may occur to those skilled in the art upon a reading and understanding of the specification. It is intended that all such embodiments be included within the scope of this invention.

What is claimed is:

1. A method of fracturing a subterranean zone penetrated by a well bore comprising the steps of:
   (a) injecting a fracturing fluid into a subterranean zone, said fracturing fluid comprising an aqueous solution, a gelling agent, and a self-degrading foaming composition whereby said self-degrading foaming composition comprises a mixture of anionic surfactant and nonionic surfactant, wherein the anionic surfactant comprises disodium lauramide monoethanol amine sulfosuccinamate;
   (b) adding a predetermined amount of gas to said subterranean zone to foam said fracturing fluid and form a foamed fracturing fluid;
   (c) contacting said subterranean zone with said foamed fracturing fluid under conditions effective to create at least one fracture therein;
   (d) maintaining the foamed fracturing fluid in contact with the subterranean zone for a predetermined time; and
   (e) recovering the foamed fracturing fluid after fracturing operations, wherein the self-degrading foaming composition forms a less stable foam when the foamed fracturing fluid is recovered after fracturing operations.

2. The method of claim 1 wherein said gelling agent comprises a polysaccharide selected from the group consisting of gum arabic, gum ghatti, gum karaya, tamarind gum, tragacanth gum, guar gum, locust beam gum, carboxymethylguar, hydroxypropylguar, carboxymethylhydroxypropylguar, and mixtures thereof.

3. The method of claim 1 wherein the gelling agent comprises hydroxypropylguar.

4. The method of claim 1 wherein the anionic surfactant is present in an amount of about 0.05 to about 2 percent of the liquid component by volume.

5. The method of claim 1 wherein the nonionic surfactant is an ethoxylated fatty acid ester of polyethylene glycol.

6. The method of claim 1 wherein the nonionic surfactant is present in an amount of about 0.05 to about 2 percent of the liquid component by volume.

7. The method of claim 1 further comprising the step of adding a proppant to the fracturing fluid before adding said gas.

8. The method of claim 1 wherein the foamed fracturing fluid has reduced foam quality after aging up to about 24 hours at temperatures from about room temperature to about 140° F.

9. The method of claim 1 wherein said gas in said foamed fracturing fluid is selected from the group consisting of air, nitrogen, carbon dioxide and combinations thereof.

10. The method of claim 1 wherein said gas in said foamed fracturing fluid is present in an amount in the range from about 20% to about 80% by volume of said aqueous solution.

11. The method of claim 1 wherein said aqueous solution is selected from the group consisting of fresh water, salt water, produced water, and combinations thereof.

12. The method of claim 1 wherein the anionic surfactant comprises a mixture selected from the group consisting of dodecylbenzenesulfonate, diphenyloxide disulfonate, sulfosuccinate, sulfosuccinamate, naphthalene-formaldehyde condensate, alkyl sulfoester, alkyl sulfoamide and mixtures thereof.

13. A method of fracturing a subterranean zone penetrated by a well bore comprising the steps of:
   (a) injecting a fracturing fluid into a subterranean zone, said fracturing fluid comprising an aqueous solution, a gelling agent, and a self-degrading foaming composition whereby said self degrading foaming composition comprises a mixture of anionic surfactant and nonionic surfactant, wherein the anionic surfactant comprises disodium lauramide monoethanol amine sulfosuccinamate;
   (b) adding a predetermined amount of gas to said subterranean zone to foam said fracturing fluid and form a foamed fracturing fluid;
   (c) contacting said subterranean zone with said foamed fracturing fluid under conditions effective to create at least one fracture therein; and
   (d) forming a less stable foam when the foamed fracturing fluid is recovered after fracturing operations.

* * * * *